Aug. 10, 1948.   E. G. MUELLER   2,446,659
CLASP BRAKE RIGGING
Filed July 6, 1946   4 Sheets-Sheet 3
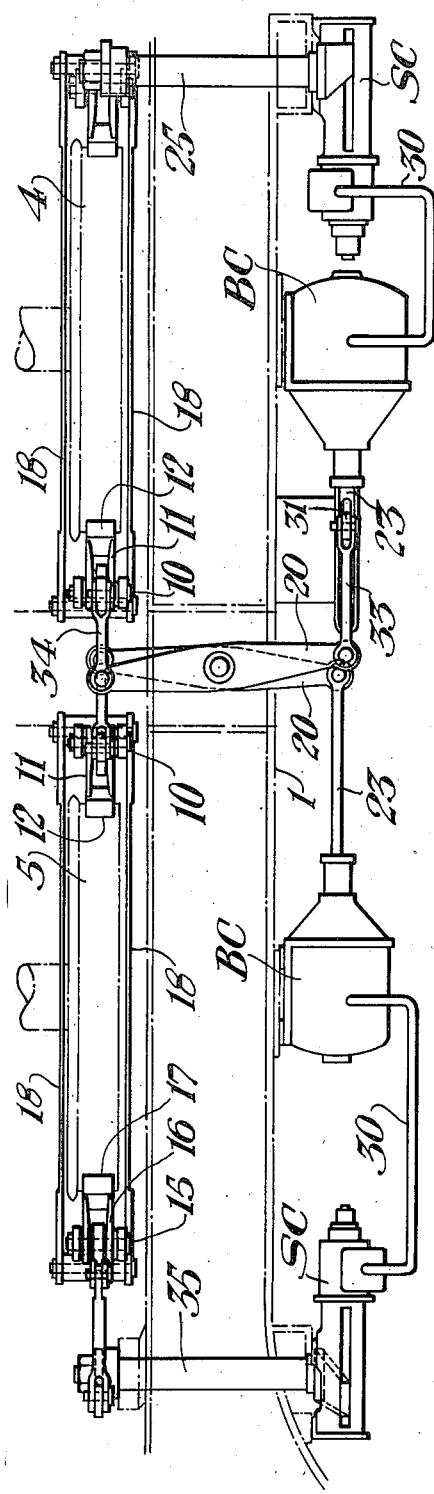
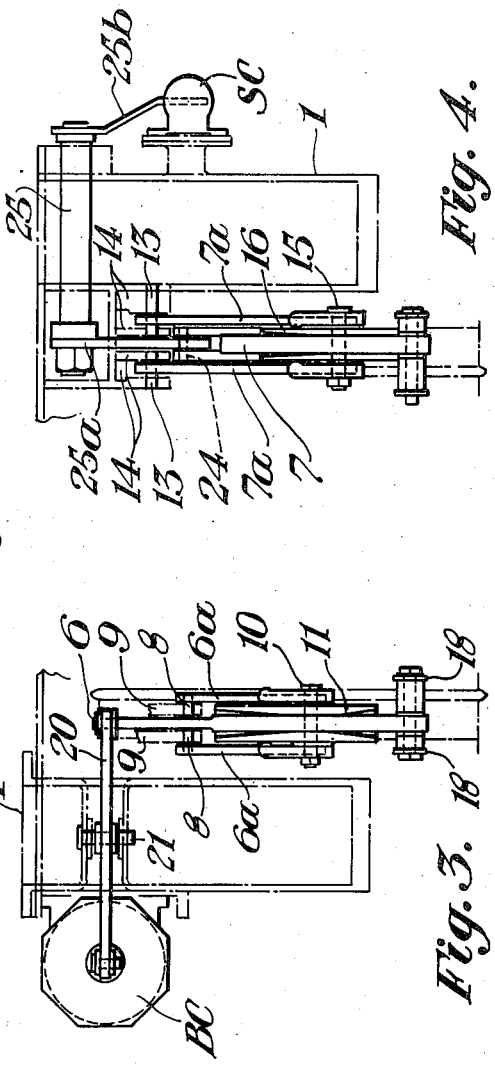
INVENTOR.
Emil G. Mueller
BY
HIS ATTORNEY

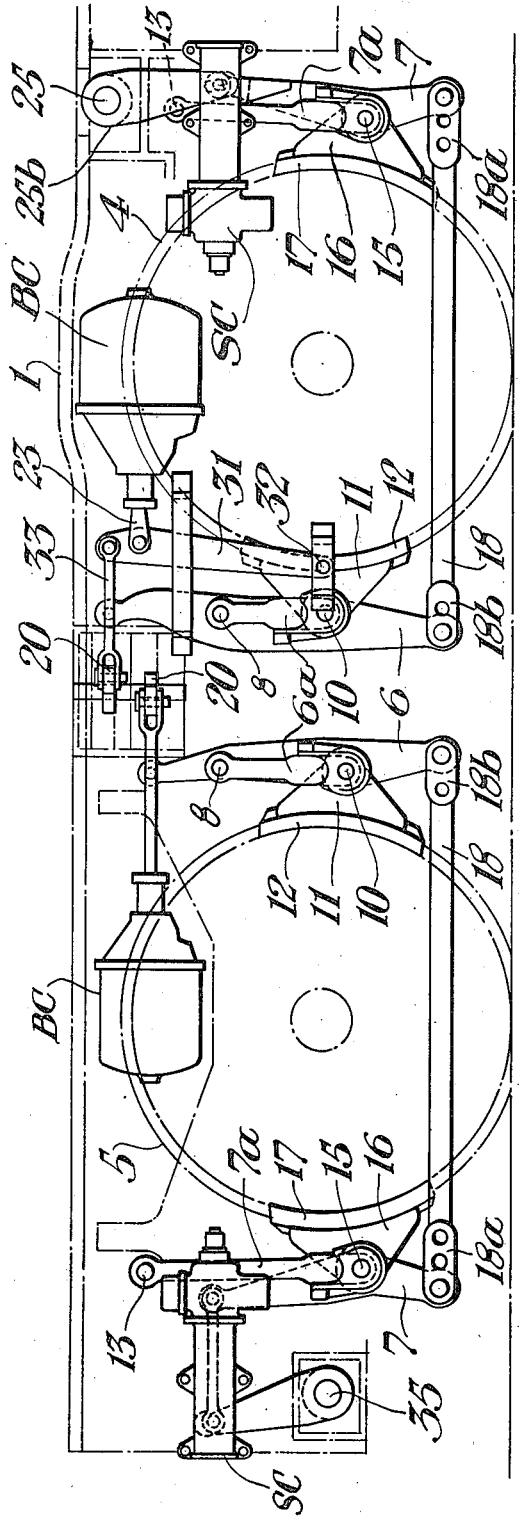

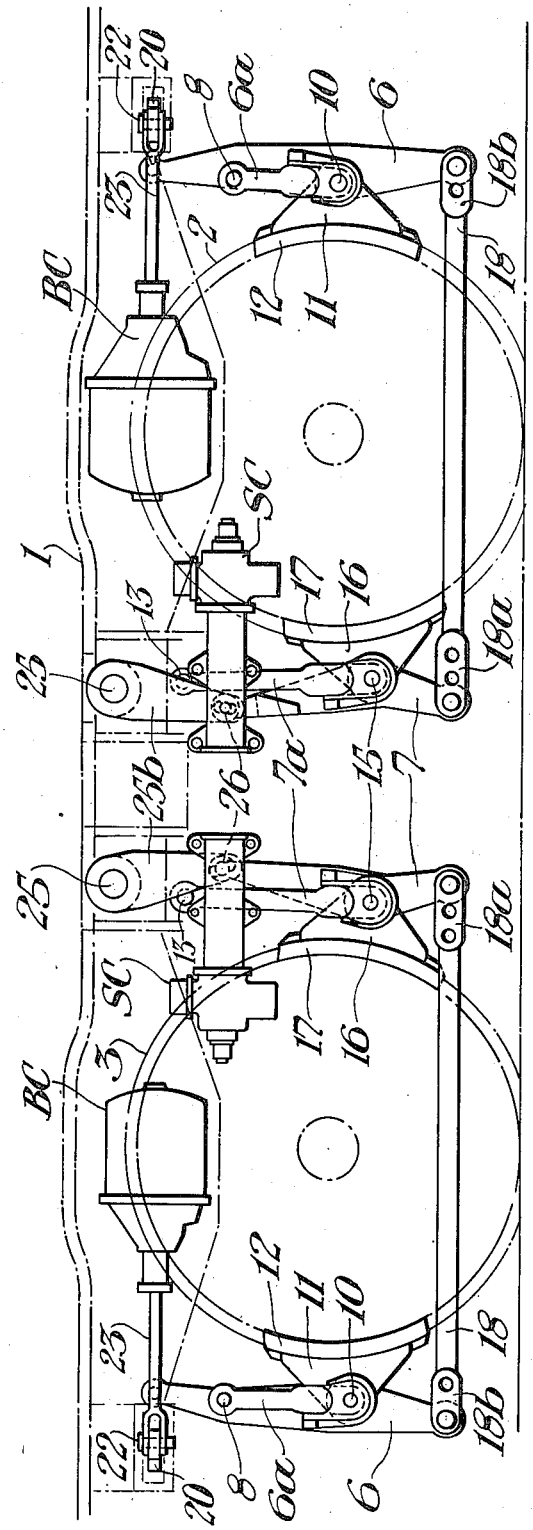

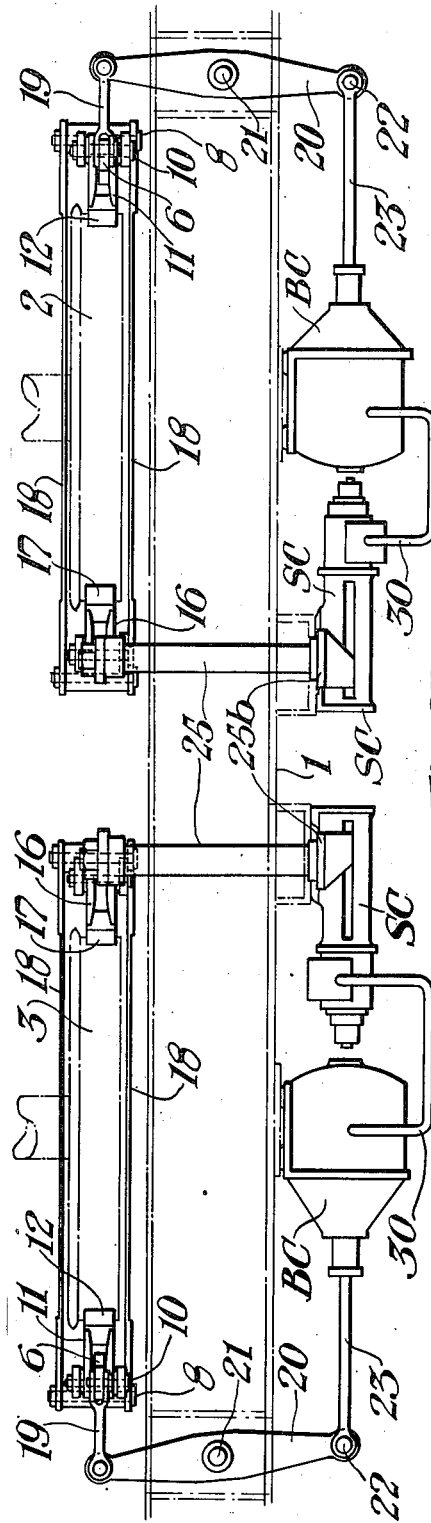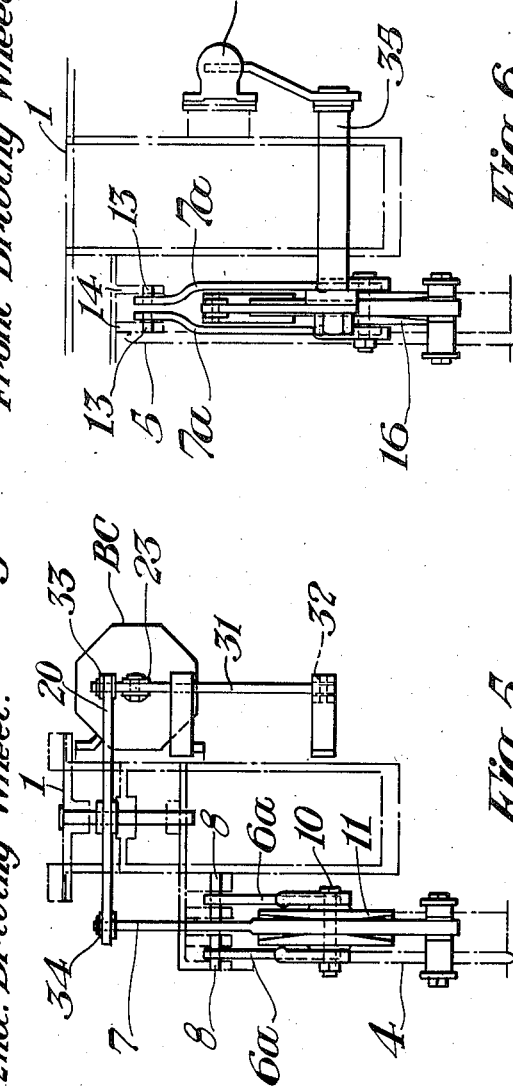

Patented Aug. 10, 1948

2,446,659

UNITED STATES PATENT OFFICE 2,446,659

CLASP BRAKE RIGGING

Emil G. Mueller, Churchill Borough, Allegheny County, Pa., assignor to The American Brake Company, Swissvale, Pa., a corporation of Missouri Application July 6, 1946, Serial No. 681,636

8 Claims. (Cl. 188—56)

My invention relates to brake rigging, and particularly to brake rigging for the driving wheels of locomotives.

One object of my invention is to provide brake rigging of the unit cylinder clasp type which is particularly suitable for, although in no way limited to, application to the driving wheels of a steam turbine electric locomotive in which there is substantially no space available between the wheels for the brake rigging.

Another object of my invention is to provide a brake rigging of the type described having the minimum weight consistent with the necessary braking power.

A further object of my invention is to provide clasp brake rigging of the type described including an automatic slack adjuster.

According to my invention the brake rigging comprises a separate brake mechanism for each wheel. These brake mechanisms are similar except for certain slight differences due to clearance requirements, and each includes a live truck lever and a dead truck lever pivotally suspended on opposite sides of an associated wheel by means of hanger links in such manner that the levers are free to move toward and away from the wheels to braking and non-braking positions. The live and dead truck levers are connected together at their lower ends by means of straddle rods and the dead truck lever is operatively connected at its upper end with the one crank arm of a crank which is journaled in the frame and which extends outwardly from a point in the same plane as the dead lever to a slack adjuster mounted on the truck frame outboard of the associated wheel. The crank is provided at its outer end with a second crank arm which is operatively connected with the automatic slack adjuster. The upper end of the live truck lever is connected by means of a double jaw with the inner end of a horizontal brake cylinder lever which is pivotally mounted intermediate its ends in a suitable support provided on the truck frame. The horizontal brake cylinder lever is operatively connected at its outer end either directly with the piston rod of the brake cylinder which is mounted on the truck frame outboard of the wheels, or indirectly through the medium of a vertically disposed transmitting cylinder lever, depending upon clearance conditions in the vicinity of the associated wheel.

Other objects and characteristic features of my invention will become apparent as the description proceeds.

I shall describe one form of brake rigging embodying my invention, and shall then point out the novel features thereof in claims.

In the accompanying drawings, Figs. 1A and 1B are side elevational views which, when placed end to end with Fig. 1A on the left, show one form of brake rigging embodying my invention applied to the wheels of the driving truck of a locomotive. Figs. 2A and 2B are top plan views of the brake rigging shown in Figs. 1A and 1B, respectively, with certain of the parts omitted for the sake of clearness. Fig. 3 is a transverse elevational view of the brake rigging associated with the one front driving wheel as it appears when viewed from the right in Fig. 1B. Fig. 4 is a transverse elevational view of the brake rigging associated with the one front driving wheel as it appears when viewed from the left in Fig. 1B. Fig. 5 is a transverse elevational view of the brake rigging associated with the third driving wheel as it appears when viewed from the left in Fig. 1A. Fig. 6 is a transverse elevational view of the brake rigging for the idler wheel of the truck as it appears when viewed from the left in Fig. 1A.

Similar reference characters refer to similar parts in each of the several views.

Referring to the drawings, I have here shown my invention applied to the driving truck of a locomotive comprising a suitable frame 1 supported by four pairs of wheels which I shall designate front, second, and third driving wheels and idler wheels, as indicated by the legends on the drawings. Only the one wheel of each pair is shown, these wheels being designated by the reference characters 2, 3, 4 and 5.

The brake rigging comprises eight separate brake mechanisms one of which is associated with each driving wheel. For the most part these mechanisms are similar, but the mechanism associated with the third driving wheel and the idler wheel differs in certain respects from the mechanism associated with the front and second driving wheels, and I shall, therefore, in the interest of brevity, first describe the mechanism associated with the front driving wheel 2, and shall then point out the manner in which the mechanisms associated with the other driving wheels and the idler wheels differ from the described mechanism.

Referring now to the mechanism associated with the front driving wheel 2, this mechanism comprises live and dead truck levers 6 and 7 pivotally suspended from the truck frame by means of pairs of hanger links 6a and 7a, respectively. The hanger links 6a are pivotally mounted at their upper ends on opposite sides of the live truck lever by means of pivot pins 8 mounted in suitable pin supports 9 provided on the truck frame, and are pivotally attached at their lower end to the live lever by means of a pivot pin 10 which also serves to secure to the lever a brake head 11 carrying a brake shoe 12 for frictional engagement with the periphery of the wheel 2. The hanger links 7a which support the dead truck lever 7 are pivotally mounted at their upper ends on opposite sides of the dead truck lever by means of pivot pins 13 mounted in pin supports 14 provided on the truck frame 1, and each link 7a is pivotally attached at its lower end to the associated dead truck lever by means of a pivot pin 15, which latter pivot pin also serves to secure to the dead truck lever a brake head 16 carrying a brake shoe 17 for frictional engagement with the periphery of the wheel 2 opposite the shoe 12. The lower ends of the live and dead truck levers are connected together by means of straddle rods 18 disposed on opposite sides of the wheel 2. The straddle rods are provided at their opposite ends with pin hole take-ups 18a and 18b in accordance with well-known practice to permit slack which may develop in the brake rigging to be taken up in a manner which will appear more fully hereinafter.

The upper end of the live truck lever 6 is operatively connected through the medium of a double jaw 19 (Fig. 2B) with the inner end of a horizontal brake cylinder lever 20 which is pivotally supported intermediate its ends on a pivot pin 21 mounted in the truck frame. The outer end of the horizontal brake cylinder lever is connected by means of a pivot pin 22 with the push rod 23 of a brake cylinder BC mounted on the truck frame outboard of the truck directly opposite the wheel 2. The brake cylinder is of the usual type and includes the usual cylinder portion, return spring (not shown), and push rod 23 operated by the piston.

The upper end of the dead truck lever 7 is connected by means of a pin and slot connection 24 (Fig. 4) with the depending crank arm 25a of a transversely extending crank 25 which is journaled in suitable supports provided in the truck frame. The crank 25 extends outwardly from a point opposite the upper end of the dead truck lever to a point outboard of the truck frame, and is provided at its outer end with a second depending crank arm 25b which is connected by a suitable pin and slot connection 26 with the crosshead of an automatic slack adjuster SC.

The slack adjuster SC is secured to a suitable support provided on the truck frame and is connected to the brake cylinder BC by a pipe 30. This slack adjuster by itself forms no part of my present invention, and may comprise any of the well-known types which will move the point of connection of the crank arm 25b with the slack adjuster toward the right a predetermined amount each time that the slack adjuster is supplied with air pressure in response to an application of the brakes.

The pipe 30 is connected with the brake cylinder at such a point that as long as no slack is present in the brake rigging the brake cylinder piston in applying the brakes will not move far enough to admit air to the pipe 30, but that when slack develops, the additional movement of the piston necessary to fully apply the brakes will then cause fluid pressure to be admitted to the pipe from the pressure side of the piston and will thus cause the slack adjuster to automatically take up the slack.

It will be noted that both the brake cylinder BC and the slack adjuster SC are mounted on the truck frame outboard of the wheels. This construction accordingly does not require any appreciable space laterally between the wheels which is essential in a steam turbine electric locomotive as the lateral space which is usually available between the driving wheels of ordinary steam locomotives is taken up in the case of the steam turbine electric locomotive by motors and gears associated with the wheels.

In operation when fluid is applied to the brake cylinder BC the push rod 23 will move outwardly and will thus move the outer end of the brake cylinder lever 20 toward the right. This movement will cause the brake cylinder lever 20 to fulcrum about the pivot pin 21 and will thus move the upper end of the live truck lever 6 toward the wheel 2. The first part of the movement of the live truck lever 6 toward the wheel 2 will cause the brake shoe 12 to move into frictional contact with the wheel, whereupon this lever will then fulcrum about the pivot pin 10 and will thus move the pull rods 18 and hence the lower end of the dead truck lever 7 toward the right. The upper end of the dead truck lever 7 due to its connection with the slack adjuster SC through the medium of the crank 25 is normally constrained to rotate about its point of connection with the crank arm 25a and its follows, therefore, that the movement of the lower end of the dead truck lever toward the right will move the brake shoe 17 into frictional engagement with the wheel 2. The parts are so proportioned that when the brake shoes have moved into engagement with the wheel, the shoes will exert substantially equal and opposite braking forces as is customary in clasp brake designs.

Upon the fluid being vented from the brake cylinder BC following the brake application, the release springs in the brake cylinder will move the piston rod 23 toward the left to its retracted position, and will thus act through the associated linkage to move the associated brake shoes out of frictional engagement with the wheel.

It will be obvious that if slack develops in the brake rigging, the resultant additional movement of the piston of the brake cylinder BC necessary to effect a brake application will act to admit fluid to the slack adjuster in the manner outlined hereinbefore, and the fluid pressure thus admitted to the slack adjuster will cause the fulcrum block of the slack adjuster to move toward the right. This movement of the fulcrum block toward the right will rotate the crank 25 in a counterclockwise direction as viewed in Fig. 1B, and hence will move the upper end of the dead truck lever 7 toward the wheel a predetermined amount so that when the next brake application occurs, the stroke of the piston of the cylinder BC necessary to apply the brakes will be reduced. It will be obvious that by proper proportioning of the parts the slack adjuster can be made to automatically take up any slack within certain limits which develops in the brake rigging. After a predetermined amount of take-up by the slack adjuster, the slack adjuster will be restored to its original position and the effective length of the pull rods 18 will then be shortened by means of the pin hole take-ups 18a and 18b, as is well understood.

Referring now to the brake mechanism associated with the second driving wheel, it will be noted that this brake mechanism is identical with that associated with the front driving wheel except for the fact that the live and dead truck levers are disposed at the opposite sides of the wheel and the brake cylinder is mounted to face in the opposite direction.

Referring next to the brake mechanism associated with the third driving wheel in order to provide clearance between the horizontal cylinder lever 20 for this wheel and the one for the idler wheel it is desirable to mount the cylinder lever for this wheel vertically above the cylinder lever for the idler wheel. Accordingly, in order to permit this to be done, the brake cylinder for this wheel instead of having its push rod 23 connected directly with the outer end of the cylinder lever 20 is connected with a vertical transmitting lever 31 intermediate its ends. The transmitting lever 31 is pivotally mounted at its lower end on a pivot pin 32 secured to the truck frame, and is operatively connected at its upper end by means of a double jaw 33 with the outer end of the associated cylinder lever 20. The inner end of the cylinder lever 20 for this wheel is connected through the medium of a double jaw 34 with the upper end of the live lever 7 which it will be noted has been lengthened to permit this connection to be made.

Referring now to the brake mechanism for the idler wheel, this mechanism is identical with that for the front driving wheel except for the fact that the crankshaft of this brake mechanism, which crankshaft is here designated 35, is rotatably mounted in the truck frame below the slack adjuster rather than above the slack adjuster to provide clearance for certain parts of the locomotive frame which are located in close proximity to the slack adjuster for this wheel.

The operation of the brake mechanism associated with the second and third driving wheels and the idler wheels is essentially the same as the operation of that associated with the front driving wheel and will be obvious from an inspection of the drawing without further detailed description.

Although I have herein shown and described only one form of brake rigging embodying my invention, it is understood that various changes and modifications may be made therein within the scope of the appended claims without departing from the spirit and scope of my invention.

Having thus described my invention, what I claim is:

1. In a brake mechanism, the combination with a truck frame and a supporting wheel therefor, live and dead truck levers pivotally supported intermediate their ends at opposite sides of said wheel by means of hangers, straddle rods connecting the lower ends of said levers, an automatic slack adjuster mounted on the truck frame outboard of the wheels, a horizontally disposed crankshaft journaled in the truck frame and provided at one end with a crank arm connected to said slack adjuster and at the other end with a crank arm connected to the upper end of said dead lever, a brake cylinder secured to the truck frame outboard of the wheels, and a horizontal brake cylinder lever operatively connecting said brake cylinder with the upper end of said live lever.

2. In a brake mechanism, the combination with a truck frame and a supporting wheel therefor, live and dead truck levers pivotally supported intermediate their ends at opposite sides of said wheel by means of hangers, straddle rods connecting the lower ends of said levers, an automatic slack adjuster mounted on the truck frame outboard of the wheels, a horizontally disposed crankshaft journaled in the truck frame and provided at one end with a crank arm connected to said slack adjuster and at the other end with a crank arm connected to the upper end of said dead lever, a brake cylinder secured to the truck frame outboard of the wheels, and a horizontal brake cylinder lever pivotally attached to the truck frame intermediate its ends and operatively connected at one end with said brake cylinder and at the other end with said live lever.

3. In a brake mechanism, the combination with a truck frame and a supporting wheel therefor, live and dead truck levers pivotally supported intermediate their ends at opposite sides of the wheel for movement toward and away from the wheel and each carrying a brake shoe for engagement with the wheel, a connection between the lower ends of said levers, an automatic slack adjuster operatively connected with the upper end of said dead lever, a brake cylinder secured to the truck frame outboard of the wheels, a vertically disposed transmitting cylinder lever pivotally attached at its lower end to the truck frame and operatively connected intermediate its ends with said brake cylinder, and a connection between the upper end of said transmitting cylinder lever and the upper end of said live lever.

4. In a brake mechanism for two adjacent wheels of a four-axle locomotive driving truck, live and dead levers pivotally supported intermediate their ends at the opposite side of each wheel for movement toward and away from the associated wheel, a connection between the lower ends of the two levers associated with each wheel, the two live levers being disposed between the wheels, a brake cylinder for each wheel mounted on the truck frame outboard of the wheel, the two brake cylinders being in longitudinal alignment with their piston rods extending toward each other, an automatic slack adjuster for each wheel operatively connected with the upper end of the dead lever associated with such wheel, a first horizontal lever pivotally supported intermediate its ends on the truck frame and operatively connected at one end with the brake cylinder associated with the one wheel and at the other end with the upper end of said live lever associated with said one wheel, a vertically disposed transmitting cylinder lever pivotally attached at its lower end to the truck frame and operatively connected intermediate its ends with the brake cylinder associated with the other wheel, and a second horizontal lever pivotally attached intermediate its ends to the truck frame and operatively connected at its outer end with the upper end of said transmitting cylinder lever and at its inner end with the upper end of the live lever associated with said other wheel.

5. In a brake mechanism, the combination with a truck frame and a supporting wheel therefor, live and dead truck levers pivotally supported intermediate their ends at opposite sides of the wheel for movement toward and away from the wheel and each carrying a brake shoe for engagement with the wheel, a connection between the lower ends of said levers, a slack adjuster operatively connected with the upper end of said dead lever, a brake cylinder secured to the truck frame outboard of the wheels, a vertically disposed transmitting cylinder lever pivotally attached at its lower end to the truck frame and operatively connected intermediate its ends with said brake cylinder, a horizontal lever pivotally attached intermediate its ends to the truck frame and operatively connected at its opposite ends with the upper ends of said transmitting and live cylinder levers respectively.

6. In brake mechanism for a vehicle truck including a truck frame supported by two adjacent wheels, clasp brake means associated with each wheel, a brake cylinder and a slack adjuster for each wheel mounted on the frame outboard of the wheels, and connections between the brake cylinder and the slack adjuster for each wheel and the associated clasp brake means, said connections including two horizontal levers pivotally supported one above the other for rotation about the same vertical axis.

7. In brake mechanism for a vehicle truck including a truck frame supported by two adjacent wheels, clasp brake means associated with each wheel, a brake cylinder and a slack adjuster for each wheel mounted on the frame outboard of the wheels, and connections between the brake cylinder and the slack adjuster for each wheel and the associated clasp brake means, said connections including two horizontal levers pivotally supported one above the other for rotation about the same pivot pin.

8. In brake mechanism for two adjacent wheels of a vehicle truck, brake levers pivotally supported intermediate their ends at the opposite sides of each wheel for movement toward and away from the associated wheel, a connection between the lower ends of the two brake levers associated with each wheel, the one brake lever which is disposed between the wheels being longer than the other lever disposed between the wheels, a brake cylinder for each wheel mounted in the frame outboard of the wheels, a slack adjuster for each wheel mounted in the truck frame outboard of the wheels, and connections between the brake cylinder and slack adjuster for each wheel and the upper ends of the brake levers for the associated wheel, said connections including two horizontal levers pivotally mounted intermediate their ends for rotation about the same vertical axis and operatively connected at their inner ends with the brake levers disposed between the wheels.

EMIL G. MUELLER.

REFERENCES CITED

The following references are of record in the file of this patent:

UNITED STATES PATENTS

| Number | Name | Date |
|---|---|---|
| 1,914,619 | Schwentler | June 20, 1933 |
| 1,947,675 | Schwentler | Feb. 20, 1934 |
| 1,969,159 | Simanek | Aug. 7, 1934 |
| 2,028,623 | Redford | Jan. 21, 1936 |